Sept. 20, 1971  H. SCHAEFF  3,606,047
VEHICLE WITH SWINGING TOOL OPERATOR
Filed June 20, 1969  3 Sheets-Sheet 1

INVENTOR.
HANS SCHAEFF
BY Arthur Schwartz

United States Patent Office 3,606,047
Patented Sept. 20, 1971

3,606,047
VEHICLE WITH SWINGING TOOL OPERATOR
Hans Schaeff, Langenburg, Germany, assignor to Karl Schaeff KG, Maschinenfabrik, Langenburg, Wurttemberg, Germany
Filed June 20, 1969, Ser. No. 834,960
Claims priority, application Germany, June 20, 1968,
P 17 59 910.9
Int. Cl. E02f 3/28
U.S. Cl. 214—138　　　　　　　　　　　　　　9 Claims

ABSTRACT OF THE DISCLOSURE

A vehicle having an excavator on the rear end wherein the operator's compartment has a seat which is rotatable so that the operator can move his location from vehicle driving position to an excavator operating position.

BACKGROUND OF THE INVENTION

This invention relates to a vehicle with a swingable working tool, especially an excavator, arranged in the area of the rear end, and with a forward-facing driver's position. The invention is based on the idea that, in vehicles with a swingable working tool, the main direction of work is mostly opposite to the main direction of driving. More specifically, this is because of the practical bracing or supporting of the working tool on a rigid axle. Since the operator, for instance, the excavator operator, requires unhindered visibility to do his job, he cannot operate the excavator in the sitting position which he assumes when driving. Moreover, the operator should be protected against the weather when driving and when operating the working tool, for instance, the excavator, a rock drill, or a crane.

One solution, that would meet these requirements, consists of a cab which is mounted on a ring-mount or turntable on the vehicle and which turns together with the working tool, as for instance, in the case of a mobile excavator, in which the tool operating position and the driver's operating position are combined in one cab. In such a piece of equipment, the drive devices are arranged inside or on the swingable cab so that it is possible to work all around and to have good visibility. As a result, there is a very small wheel base and the equipment therefore can move only at slow driving speeds. With respect to the driving performance, it is likewise not advantageous to move the drive, through the central swing-axle, closer to the wheels or the driving axle.

Another known version is represented by the so-called truck-cranes which have two driver's cabs; accordingly the driver must change positions in order to operate the working tool.

In order to guarantee optimum visibility and operating conditions, we therefore have two basic designs that are known in this respect. In one of them, a work cab is additionally provided next to the driver's cab near the working position. This solution is disadvantageous because of the need for having the driver change positions and because of the expenditure which a driver's cab as well as a swingable work cab bring about in terms of space and cost. In the other known design, the levers, necessary for driver operation, as well as the tool control panel or dashboard are inside the swingable cab. This solution is very good for the operator but in terms of design it is extremely costly because it is necessary to provide expensive lead-throughs for driving, that is to say, for the engine, the coupling, and the gears, or, instead, to provide hydraulic or pneumatic actuated devices which are vulnerable to failure. Here all lead-through lines run through the central swing-axle.

SUMMARY OF THE INVENTION

The invention is based on the task of eliminating the above mentioned disadvantages and providing an inexpensive and simple design which will facilitate both good visibility and perfect operation and which will also prevent the need for having the driver change positions. According to the invention, a vehicle of the above-described manner is proposed for this purpose, where the driver's cab as well as the excavator operating position are associated with a common swingable seat within a common, fixed cab, whose base plate covers the swingable excavator frame or chassis and in which the excavator operating position can be swung along, with the excavator chassis, above the base plate.

The basic idea behind the invention at hand thus consists of placing the drive elements for the wheels, or the tracks, not on the swingable component of the vehicle but rather into the drive chassis in order thus to avoid the costly lead-throughs going through the central point. In order nevertheless to create the best possible visibility and operating conditions, a seat, attached above the swing center, performs a swing of about 250°, along with the operation control panel in the cab. The operating position for the working tool thus moves along with the swinging motion of the working tool inside the fixed cab. A further advantage arises in this arrangement from the still relatively low-lying center of gravity as well as the good driving performance which can be achieved with a vehicle built according to the theories and lessons of the invention at hand.

It is furthermore proposed that, according to the invention, the cab reveal a circular or polygonal plan view adapted to the swing radius and swing circle of the excavator operating position, a plan view which will make a transition into an essentially rectangular protrusion which is directed forward toward the driver's position. The design of the cab, which is circular over at least 250°, in accordance with the swing radius of the working tool, offers the advantage that it requires little in the way of bracing and that it therefore can be mounted rather inexpensively by combining two cabs, in contrast to the known designs.

Preferably, the seat retaining devices or bearing as well as the excavator operating position are attached on a lead-through pipe, which is firmly connected with the excavator chassis by means of the fixed base plate. In this design, the operator participates in the swing motions of the working tool along with the control panel.

If the seat retaining device or bearing as well as the excavator operating position are attached to a column, which is perpendicular and rotatably positioned on the base plate and which is coupled to the excavator swing axle by means of a transmission, then—depending upon the transmission ratio—the excavator operating position can more or less follow along the swing angle of the working tool. This design is practical for example when the swing axle is no longer in the area of the fixed base plate of the cab. It is a good idea to have the seat bearing have a perpendicular pin around which the seat can be swung and can be locked in at least two positions.

DESCRIPTION OF THE DRAWINGS

The invention is explained in greater detail below with the help of the examples shown in the figures.

DESCRIPTION OF THE PREFERRED EMBODIMENTS

Figure 1:
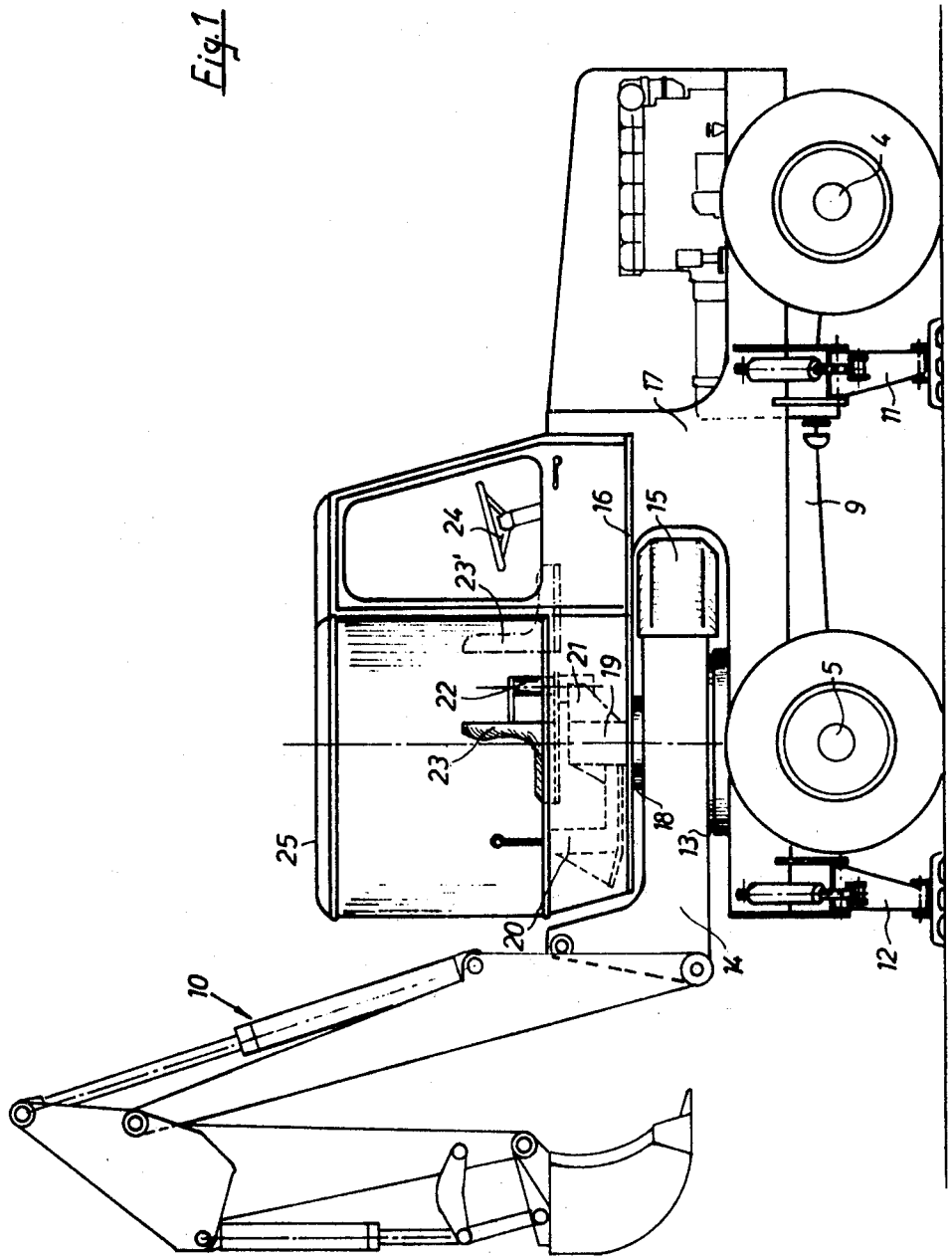
FIG. 1 shows a two-axle vehicle with a swingable working tool and a driver's cab which is common for the driver's position and the tool operating position.
Figure 2:
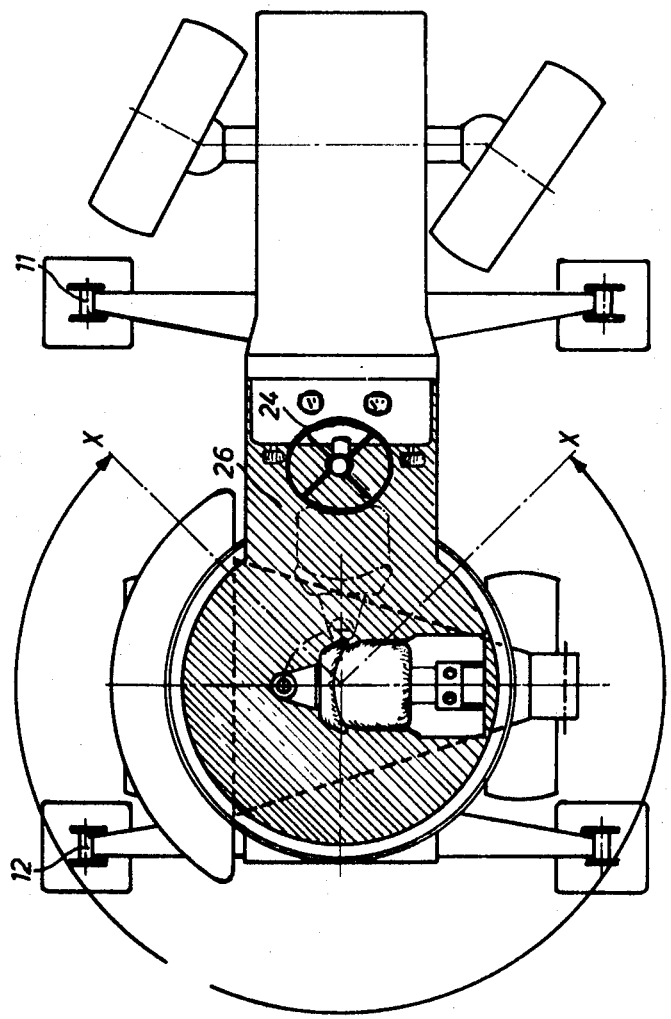
FIG. 2 is a top view of the vehicle shown in FIG. 1, whereby the tool operating position, with respect to FIG. 1, has been swung around by 90°.

The vehicle according to FIGS. 1 and 2 contains a front axle 4, a rear axle 5, a chassis 9 on which front and rear supporting legs 11 and 12 can be lowered to provide stability in case of use of the excavator 10 arranged on the rear end.

In the rear area of the vehicle chassis 9, above the vehicle wheels, the excavator chassis 14 is swingably positioned with a counter weight 15 on a ring-mount or turntable 13. The excavator chassis is covered by a base plate 16 which is attached on a braced protrusion 17 on the chassis which protrudes upward and which, moreover, rests on a supporting bearing 18, above ring-mount 13. The excavator operating position 20 as well as a seat bearing 21 are attached to a lead-through pipe 19 which is connected with the excavator chassis 14. A stop location of a swingable seat 23 which can be swung around an axle 22 is associated with the excavator operating position 20. According to the illustration in FIGS. 1 and 2, the operating position 20 moves together with the seat 23 according to the swinging movement of the excavator. If the vehicle is to be driven to another place in case of ditch-digging or after the completion of earth work, the seat 23 is swung from its position shown in FIG. 1 by 180°, around axle 22 into the position 23, shown with the dot-dash lines, so that it will be pointing toward the driver's position, indicated with wheel 24.

The plan view of base plate 16 is indicated in FIG. 2. This illustrates that the shape of the base plate is adapted to the swing in an arc of about a 250° swing circle X of the excavator operating position 20 and that, moreover, there is sufficient room for the driver's position 24. The ground plan view of cab 25 corresponds exactly to the plan view of base plate 16. This cab 25, can, if necessary, be made of synthetic, transparent material in its upper portion, corresponding to the swing range of the excavator, and can therefore guarantee unhindered visibility. The predominantly round or arcuate form of a cab makes any additional bracing unnecessary.

Figure 3:
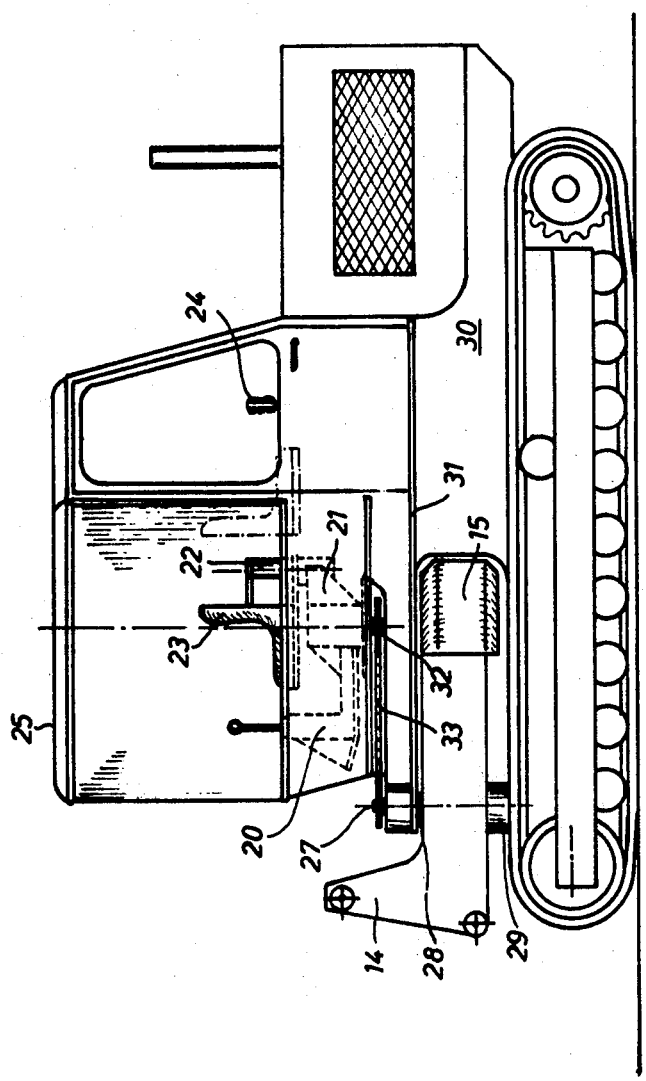
FIG. 3 shows a tracked vehicle with a swingable positioned working tool and a combined cab for the driver's position and the tool operating position.

The example shown in FIG. 3 differs from the one shown in FIG. 1 essentially only by virtue of the fact that the vehicle runs on tracks and that the frame or chassis 14 of the working tool is not placed on a ring-mount but rather can be rotated around a swing axis 27 which is supported or braced on bearings 28, 29. The vehicle chassis 30, in the case at hand, is very strong so that the swing axis 27 can be braced with sufficient stability at its upper end by means of a specially braced base plate 31. The plan view of the base plate can essentially correspond to that in FIG. 2 and the remainder of the arrangement of the fixed cabin and the swingable operating position therein for the working tool, which is essential to the invention, corresponds approximately to the first version, although with the deviation that the operating position 20 as well as the seat bearing 21 are attached to a column 32 which is rotatably positioned above base plate 31; this column is coupled with the swing axle 27 via a chain-drive 33. Depending upon the transmission ratio of this chain-drive, the swingable operating position 20 will more or less follow along the particular swing position of the working tool.

I claim:
1. A vehicle comprising:
   (a) a vehicle chassis;
   (b) a working tool chassis rotatably mounted on said vehicle for swinging movement with respect to said vehicle chassis;
   (c) a working tool mounted on said working tool chassis;
   (d) a rotatable operator position on said vehicle for controlling said working tool;
   (e) a baseplate mounted on said vehicle above said vehicle chassis and below said operator position, said baseplate being fixed with respect to said vehicle chassis;
   (f) a rotatable seat support on said vehicle above said baseplate, said seat support and said operator position being coupled with said working tool chassis for at least partial co-rotation therewith; and
   (g) a driving position on said vehicle, said driving position being fixed with respect to said vehicle chassis and located in the vicinity of said baseplate.

2. A vehicle as defined in claim 1, further comprising a seat on said seat support, said seat being rotatable between said operator position and said driving position independently of the rotation of said working tool chassis and said operator position.

3. A vehicle as defined in claim 2 wherein said seat may be locked facing either of said two positions.

4. A vehicle as defined in claim 1 wherein said working tool is an excavator.

5. A vehicle as defined in claim 1, further comprising a cab fixedly mounted thereto above said base plate.

6. A vehicle as defined in claim 5 wherein said cab has a substantial portion thereof arcuately shaped.

7. A vehicle as defined in claim 1 wherein said working tool chassis is rotatable through an arc of approximately 250°.

8. A vehicle as defined in claim 1, further comprising a lead through pipe connected with said working tool chassis and passing through said baseplate, said seat support and said operating position being attached to said lead through pipe.

9. A vehicle as defined in claim 1, further comprising:
   (a) a swing axis about which said working tool chassis rotates;
   (b) a column rotatably positioned above said base plate, said seat support and said operating position being attached to said column; and
   (c) a transmission means coupling said swing axis and said column to transmit the rotary movement of said swing axis to said column.

References Cited

UNITED STATES PATENTS

| | | | |
|---|---|---|---|
| 2,805,847 | 9/1957 | Malloy | 37—117.5X |
| 3,452,888 | 7/1969 | Larson et al. | 214—132X |
| 3,484,005 | 12/1969 | Guinot | 214—138 |

FOREIGN PATENTS

| | | | |
|---|---|---|---|
| 1,051,740 | 2/1959 | Germany | 214—138 |

GERALD M. FORLENZA, Primary Examiner

F. E. WERNER, Assistant Examiner

U.S. Cl. X.R.

37—103